US012764392B2

(12) United States Patent
Zhang et al.

(10) Patent No.: US 12,764,392 B2
(45) Date of Patent: Oct. 13, 2026

(54) VIDEO GENERATION METHOD, APPARATUS, DEVICE AND STORAGE MEDIUM

(71) Applicant: Beijing Zitiao Network Technology Co., Ltd., Beijing (CN)

(72) Inventors: Yuhui Zhang, Beijing (CN); Ailing Xu, Beijing (CN); Tianyu Liang, Beijing (CN); Jingwu Mei, Beijing (CN); Peifeng Lin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/140,851

(22) PCT Filed: Dec. 5, 2023

(86) PCT No.: PCT/CN2023/136538
§ 371 (c)(1),
(2) Date: Jun. 18, 2025

(87) PCT Pub. No.: WO2024/131522
PCT Pub. Date: Jun. 27, 2024

(65) Prior Publication Data

US 2026/0230686 A1 Aug. 6, 2026

(30) Foreign Application Priority Data

Dec. 19, 2022 (CN) ........................ 202211635289.5

(51) Int. Cl.
*H04N 21/81* (2011.01)
*H04N 21/44* (2011.01)
*H04N 21/854* (2011.01)

(52) U.S. Cl.
CPC ..... *H04N 21/816* (2013.01); *H04N 21/44008* (2013.01); *H04N 21/854* (2013.01)

(58) Field of Classification Search
None
See application file for complete search history.

(56) References Cited

U.S. PATENT DOCUMENTS

2003/0189588 A1 10/2003 Girgensohn et al.
2016/0345035 A1* 11/2016 Han ................ H04N 21/21805

FOREIGN PATENT DOCUMENTS

CN 102326181 A 1/2012
CN 110830852 A 2/2020
(Continued)

OTHER PUBLICATIONS

International Patent Application No. PCT/CN2023/136538; Int'l Search Report; dated Mar. 7, 2024; 3 pages.

*Primary Examiner* — Junior O Mendoza
(74) *Attorney, Agent, or Firm* — BakerHostetler

(57) ABSTRACT

The present disclosure provides a video generation method, apparatus, and device, and a storage medium. The method includes: First, a plurality of video segments are obtained based on a plurality of video regions in a video template, and then with respect to preset action features corresponding to the video template, feature recognition is performed on the video segments, and video frames corresponding to the video segments are determined based on video frames in the video segments having the preset action features; and then image compositing is performed on the plurality of video segments based on the key frames corresponding to the video segments and the display time information and the display position information of the video segments to obtain a composited result video corresponding to the video template.

20 Claims, 3 Drawing Sheets

(56) References Cited

FOREIGN PATENT DOCUMENTS

| | | | |
|---|---|---|---|
| CN | 112291484 | A | 1/2021 |
| CN | 113452941 | A | 9/2021 |
| CN | 114731458 | A | 7/2022 |
| CN | 115209222 | A | 10/2022 |

* cited by examiner

VIDEO GENERATION METHOD, APPARATUS, DEVICE AND STORAGE MEDIUM

CROSS-REFERENCE TO RELATED APPLICATION(S)

The present application is a national stage application filed under 35 U.S.C. 371 based on International Patent Application No. PCT/CN2023/136538, filed Dec. 5, 2023, which claims priority to Chinese Patent Application No. 202211635289.5, filed on Dec. 19, 2022, and entitled "VIDEO GENERATION METHOD, APPARATUS, AND DEVICE, AND STORAGE MEDIUM", which are incorporated herein by reference in their entireties.

FIELD

The present disclosure relates to the field of data processing, and in particular, to a video generation method, apparatus, and device, and storage medium.

BACKGROUND

With the continuous development of video processing technologies, there are increasing demands for video shooting and editing.

SUMMARY

Embodiments of the present disclosure provide a video generation method.

According to a first aspect, the present disclosure provides a video generation method. The method includes:

obtaining a plurality of video segments based on a plurality of video regions in a video template, where the plurality of video segments have a correspondence with the plurality of video regions, and the video regions are configured with display position information of the corresponding video segments and display time information of the video segments;

performing, with respect to preset action features corresponding to the video template, feature recognition on the video segments, and determining key frames corresponding to the video segments based on video frames in the video segments having the preset action features; and performing image compositing on the plurality of video segments based on the key frames corresponding to the video segments and the display time information and the display position information of the video segments to obtain a composited result video corresponding to the video template.

In an optional implementation, performing the image compositing on the plurality of video segments based on the key frames corresponding to the video segments and the display time information and the display position information of the video segments to obtain the composited result video corresponding to the video template includes:

determining display time of the key frames corresponding to the video segments based on the display time information of the video segments; and performing image compositing on the plurality of video segments based on the display time of the key frames corresponding to the video segments and the display position information of the video segments to obtain the composited result video corresponding to the video template.

In an optional implementation, before performing the image compositing on the plurality of video segments based on the display time of the key frames corresponding to the video segments and the display position information configured for the video regions corresponding to the video segments to obtain the composited result video corresponding to the video template, the method further includes:

adjusting display effect parameter values of the plurality of video segments based on preset display effect information.

In an optional implementation, before performing the image compositing on the plurality of video segments based on the display time of the key frames corresponding to the video segments and the display position information configured for the video regions corresponding to the video segments to obtain the composited result video corresponding to the video template, the method further includes:

recognizing a target object in the plurality of video segments, and aligning positions of the target object on video images in the plurality of video segments.

In an optional implementation, before performing the image compositing on the plurality of video segments based on the display time of the key frames corresponding to the video segments and the display position information configured for the video regions corresponding to the video segments to obtain the composited result video corresponding to the video template, the method further includes:

performing weighted image fusion frame by frame on the video segments respectively corresponding to the plurality of video regions in the video template.

In an optional implementation, performing, with respect to the preset action features corresponding to the video template, the feature recognition on the video segments includes:

performing, with respect to a preset action feature corresponding to a first video region in the video template, feature recognition on a video segment corresponding to the first video region.

In an optional implementation, obtaining the plurality of video segments based on the plurality of video regions in the video template includes:

displaying a video shooting page in response to a first trigger operation for a second video region in the video template, and obtaining, based on the video shooting page, a video segment corresponding to the second video region.

In an optional implementation, obtaining the plurality of video segments based on the plurality of video regions in the video template includes:

displaying a user material page in response to a second trigger operation for a third video region in the video template; and obtaining, based on the user material page, a video segment corresponding to the third video region.

In an optional implementation, after obtaining the plurality of video segments based on the plurality of video regions in the video template, the method further includes:

establishing, in response to an operation of dragging a first video segment in the plurality of video segments from a fourth video region to a fifth video region, a correspondence between the first video segment and the fifth video region.

According to a second aspect, the present disclosure provides a video generation apparatus. The apparatus includes:

- an obtaining module configured to obtain a plurality of video segments based on a plurality of video regions in a video template, where the plurality of video segments have a correspondence the plurality of video regions, and the video regions are configured with display position information of the corresponding video segments and display time information of the video segments;
- a determination module configured to perform, with respect to preset action features corresponding to the video template, feature recognition on the video segments, and determine key frames corresponding to the video segments based on video frames in the video segments having the preset action features; and
- a compositing module configured to perform image compositing on the plurality of video segments based on the key frames corresponding to the video segments and the display time information and the display position information of the video segments to obtain a composited result video corresponding to the video template.

According to a third aspect, the present disclosure provides a computer-readable storage medium, where the computer-readable storage medium stores instructions therein, and the instructions, when run on a terminal device, cause the terminal device to implement the method described above.

According to a fourth aspect, the present disclosure provides a video generation device. The device includes: a memory, a processor, and a computer program stored on the memory and runnable on the processor, where the processor, when executing the computer program, implements the method described above.

According to a fifth aspect, the present disclosure provides a computer program product. The computer program product includes a computer program/instruction. The computer program/instruction, when executed by a processor, causes the method described above to be implemented.

BRIEF DESCRIPTION OF THE DRAWINGS

The accompanying drawings herein, which are incorporated into and form a part of the description, illustrate the embodiments in line with the present disclosure and are used in conjunction with the description to explain the principles of the present disclosure.

In order to more clearly illustrate the technical solutions in the embodiments of the present disclosure or in the prior art, the accompanying drawings for describing the embodiments or the prior art will be briefly described below. Apparently, those of ordinary skill in the art may still derive other drawings from these accompanying drawings without creative efforts.

DETAILED DESCRIPTION OF EMBODIMENTS

For a clearer understanding of the above objectives, features, and advantages of the present disclosure, the solutions of the present disclosure will be further described below. It should be noted that the embodiments of the present disclosure and features in the embodiments may be combined with each other without conflict.

Many specific details are set forth in the following description to facilitate a full understanding of the present disclosure. However, the present disclosure may also be implemented in other ways different from those described herein. Apparently, the embodiments in the description are only some rather than all of the embodiments of the present disclosure.

With the continuous development of video processing technology, there are increasing demands for functions related to video shooting and editing. However, most users do not have professional video shooting and editing skills.

Therefore, how to facilitate the user's content creation, reduce the requirements for the users' video shooting and editing skills, and satisfy the users' experience of participating in video creation is a technical problem that urgently needs to be solved.

To this end, the embodiments of the present disclosure provide a video generation method, in which a plurality of video segments are first obtained based on a plurality of video regions in a video template, and then with respect to preset action features corresponding to the video template, feature recognition is performed on the video segments, and video frames corresponding to the video segments are determined based on the video frames in the video segments having the preset action features; and then image compositing is performed on the plurality of video segments based on the key frames corresponding to the video segments and the display time information and the display position information of the video segments to obtain a composited result video corresponding to the video template. As can be seen, according to the embodiments of the present disclosure, it is possible to implement compositing of a plurality of video segments based on a video template including a plurality of video regions and preset action features, thereby reducing the requirements for the users' video shooting and editing skills and also satisfying the users' experience of participating in video creation.

Figure 1:
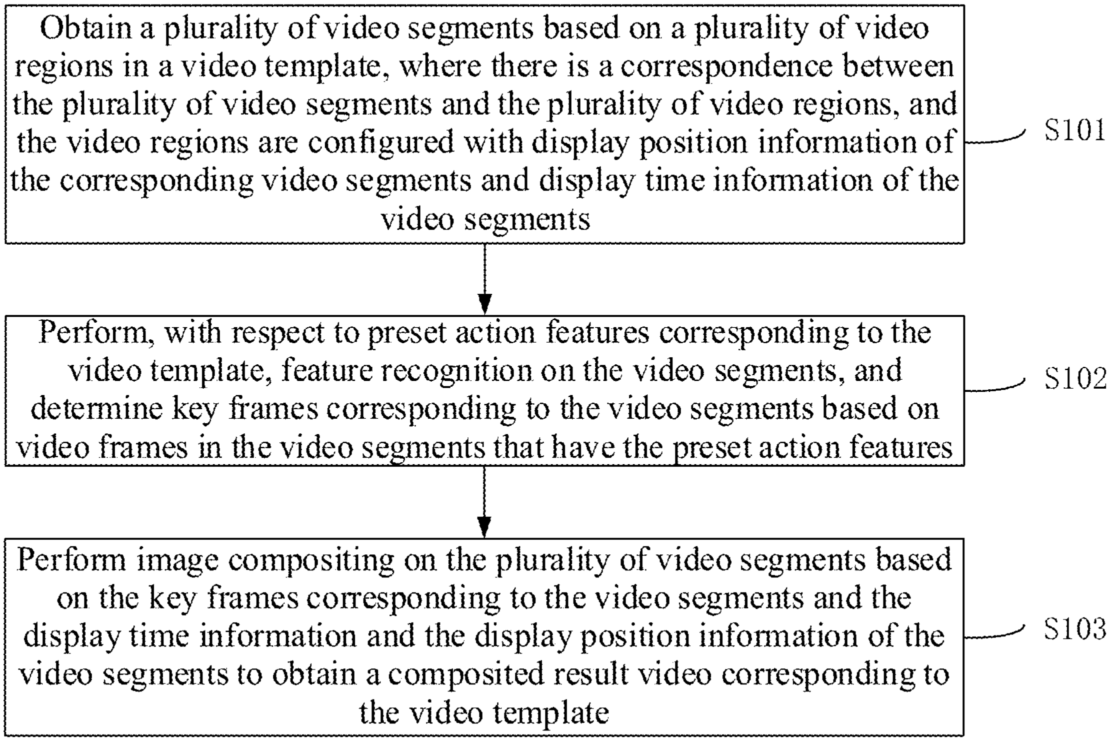
FIG. 1 is a flowchart of a video generation method according to an embodiment of the present disclosure.

On this basis, an embodiment of the present disclosure provides a video generation method. As shown in FIG. 1, which is a flowchart of a video generation method according to an embodiment of the present disclosure, the method includes the following steps.

S101: Obtain a plurality of video segments based on a plurality of video regions in a video template.

There is a correspondence between the plurality of video segments and the plurality of video regions in the video template, and the video regions are configured with display position information of the corresponding video segment and display time information of the video segment.

In this embodiment of the present disclosure, the video template may be a video template provided with a plurality of video regions, where the plurality of video regions may include two or more video regions, each of which is used to display a corresponding video segment.

In this embodiment of the present disclosure, there is a correspondence between a plurality of video segments and a plurality of video regions in the video template. That is, when obtaining the video segments based on the video template, corresponding video segments may be obtained for the video regions, respectively. For example, a video segment A with a duration of 15 seconds may be obtained based on a video region a in the video template, and a video segment B with a duration of 10 seconds may be obtained for a video region b.

In this embodiment of the present disclosure, since different video regions are configured with display position information and display time information of the corresponding video segments, during the subsequent video compositing, video compositing may be performed based on the display position information and the display time information corresponding to the video segments, where the display position information and the display time information configured for the video regions may be determined based on actual needs.

In this embodiment of the present disclosure, a video region is configured with display time information of a corresponding video segment, indicating a playback interval of the video segment corresponding to the video region on the timeline of a composited result video obtained based on the video template. For example, assuming that the video duration of the composited result video is 10 seconds, and the display time information of the corresponding video segments configured for video regions a, b, and c in the video template are 0 to 3 seconds, 3 to 5 seconds, and 5 to 10 seconds, respectively. That is, the playback interval of the video segment corresponding to the video region a is 0 to 3 seconds, the playback interval of the video segment corresponding to the video region b is 3 to 5 seconds, and the playback interval of the video segment corresponding to the video region c is 5 to 10 seconds. Subsequently, the video segments corresponding to the video regions a, b, and c may be composited based on the playback intervals determined above.

In this embodiment of the present disclosure, a video region is configured with display position information of a corresponding video segment, which refers to a display interval of the video segment corresponding to the video region on a video image of the composited result video obtained based on the video template.

Figure 2:
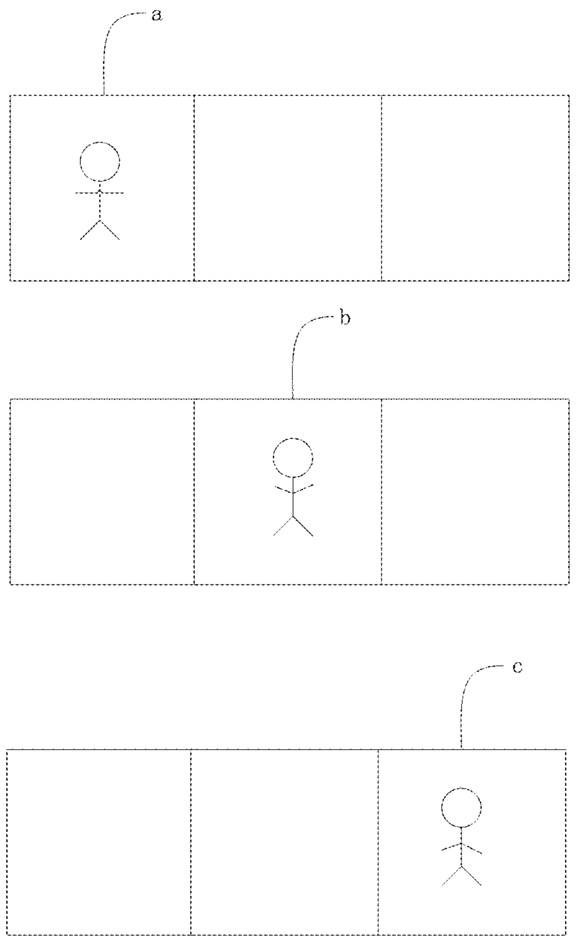
FIG. 2 is a schematic diagram of a video template according to an embodiment of the present disclosure.
Figure 3:
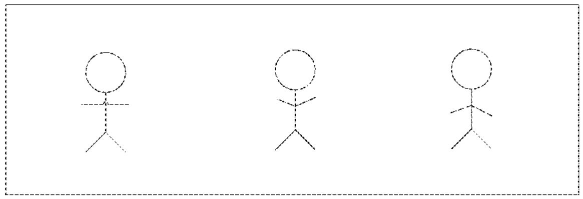
FIG. 3 is a schematic diagram of an effect of a composited result video according to an embodiment of the present disclosure.

FIG. 2 illustrates a schematic diagram of a video template according to an embodiment of the present disclosure. The video regions in the video template are a, b, and c, respectively. The display position information and the display time information of a video segment A corresponding to the video region a are the left one-third region in the video image, and 0 to 3 seconds, respectively; the display position information and the display time information of a video segment B corresponding to the video region b are the middle one-third region in the video image, and 3 to 5 seconds, respectively; and the display position information and the display time information of a video segment C corresponding to the video region c are the right one-third region in the video image, and 5 to 10 seconds, respectively. Thus, the plurality of video segments obtained may be subsequently composited based on the display position information and the display time information configured for the respective video regions to obtain a composited result video. FIG. 3 illustrates a schematic diagram of an effect of a composited result video corresponding to a video template according to an embodiment of the present disclosure.

In this embodiment of the present disclosure, a plurality of video segments may be obtained based on a video shooting page, or a plurality of video segments may be obtained based on a user material page. For these two scenarios, this embodiment of the present disclosure provides corresponding video segment obtaining methods, and the specific implementations are introduced in the following embodiments and will not be repeated herein.

In practical applications, after obtaining the plurality of video segments based on the plurality of video regions in the video template, the correspondence between the video regions and the video segments may be adjusted. Specifically, in response to an operation of dragging a first video segment in the plurality of video segments from a fourth video region to a fifth video region, the correspondence between the first video segment and the fifth video region is established.

The first video segment may be a video segment that corresponds to the fourth video region in the video template; and the fourth video region and the fifth video region may each be any video region in the target video segment.

In this embodiment of the present disclosure, by dragging the first video segment from the fourth video region to the fifth video region, the correspondence between the first video segment and the fifth video region may be established. Specifically, the display time information and the display position information configured for the fifth video region are determined as the display time information and the display position information of the first video segment, and at the same time, the correspondence between the first video segment and the fourth video region is removed.

As shown in FIG. 2, assuming that the current video region where the first video segment is located is b (i.e., the fourth video region), upon receiving the operation of dragging the first video segment from the video region b to the video region c (i.e., the fifth video region), the display position information and the display time information of the first video segment are determined as the display position information and the display time information configured for the video region c (i.e., the fifth video region).

S102: Perform, with respect to preset action features corresponding to the video template, feature recognition on the video segments, and determine key frames corresponding to the video segments based on video frames in the video segments that have the preset action features.

In this embodiment of the present disclosure, the preset action features may include one or more action features preset in the video template, such as features of a heart action, a hand-raising action, and the like.

In an optional implementation, an image feature recognition algorithm may be used to perform feature recognition on each of the plurality of obtained video segments, and then video frames in each video segment having the preset action features are obtained. The image feature recognition algorithm may include a behavior recognition algorithm based on unsupervised learning (machine learning), a behavior recognition algorithm based on convolutional neural networks (CNN), and so on, which is not limited in the embodiments of the present disclosure.

In this embodiment of the present disclosure, the video frames having the preset action features refer to one or more video images in the obtained video segments that contain the preset action features. For example, assuming that the preset action feature corresponding to the video template is the feature of a hand-raising action, one or more video images containing the feature of the hand-raising action may be obtained when performing feature recognition on the obtained video segments.

In an optional implementation, to further enrich the function of generating a video based on a video template, a corresponding preset action feature may be set for each of the video regions in the video template, and then based on the preset action feature corresponding to each of the video regions, feature recognition may be performed on the video segment corresponding to the video region to obtain key frames in the video segment.

In addition, each video region may be configured with a corresponding preset action feature, and the correspondence between the video regions and the preset action features may be determined based on actual needs. Specifically, different preset action features may be set for the respective video regions according to the display position information and the display time information corresponding to the respective video regions.

In practical applications, with respect to a preset action feature corresponding to a first video region in the video template, feature recognition may be performed on a video segment corresponding to the first video region, where the first video region may be any video region in the video template. As shown in FIG. 2, assuming that the display time information configured for the video region a is 0 to 3 seconds, the display time information configured for the video region b is 3 to 5 seconds, and the display time information configured for the video region c is 5 to 10 seconds. Based on the above display time information, the preset action feature corresponding to the video region a may be set as "arms horizontal", the preset action feature corresponding to the video region b may be set as "arms raised", and the preset action feature corresponding to the video region c may be set as "arms lowered". The display effect of the finally composited video is as shown in FIG. 3.

In practical applications, after performing feature recognition on a video segment to obtain video frames having preset action features, a key frame corresponding to the video segment may be determined based on the video frames, which facilitates the subsequent determination of the display time of the key frame.

In an optional implementation, the last frame of video image of the obtained video frames that have the preset action features may be determined as the key frame corresponding to the video segment.

In another optional implementation, the first frame of video image of the obtained video frames having the preset action features may be determined as the key frame corresponding to the video segment.

In another optional implementation, a definition detection is performed on the obtained video frames having the preset action features first, and then one of the obtained frames of video image that has higher definition is determined as the key frame corresponding to the video segment.

The method for determining the key frame corresponding to the video segment is not limited in the embodiments of the present disclosure.

S103: Perform image compositing on the plurality of video segments based on the key frames corresponding to the video segments and the display time information and the display position information of the video segments to obtain a composited result video corresponding to the video template.

In this embodiment of the present disclosure, the composited result video refers to the video obtained after performing image compositing on the plurality of video segments. For example, image compositing may be performed on the obtained plurality of video segments based on the display position information and the display time information configured for the video regions to obtain a composited result video. The specific compositing effect can be understood with reference to FIGS. 2 and 3.

In an optional implementation, a multimedia video processing tool (Fast Forward Mpeg, FFmpeg, etc.) may be invoked to perform compositing on a plurality of video segments to obtain a composited result video corresponding to the video template. The compositing method is not limited in the embodiments of the present disclosure, and can be specifically selected based on actual needs.

In practical applications, after the key frames corresponding to the video segments are determined, the display time of the key frames corresponding to the video segments may be determined based on the display time information of the video segments, and then image compositing may be performed on the plurality of video segments based on the display time of the key frames and the display position information of the video segments to obtain the composited result video corresponding to the video template.

The specific implementation of determining display time of the key frames corresponding to the video segments based on the display time information of the video segments is not limited in the embodiments of the present disclosure.

In an optional implementation, after the key frames corresponding to the video segment are determined, the key frames may be used as the last frames of video image, and the display time of the key frames corresponding to the video segments may be determined based on the display time information configured for the video regions, and then image compositing may be performed on the plurality of video segments based on the display time of the key frames and the display position information of the video segments.

For example, assuming that the total duration of the video segment A is 20 seconds, the obtained key frame is the video frame corresponding to the video segment A at the 15th second, the display time information configured for the video region a corresponding to the video segment A is 0 to 5 seconds, and the total duration of the composited result video corresponding to the video region a is 10 seconds, then the video image corresponding to the playback interval of 10 to 15 seconds in the video segment A may be determined as the content displayed in the video region a at 0 to 5 seconds, and the key frame corresponding to the video segment A may be determined as the content displayed in the video region a at 5 to 10 seconds.

In another optional implementation, after the key frames corresponding to the video segment are determined, the key frames may be used as the first frames of video image, and the display time of the key frames corresponding to the video segments may be determined based on the display time information configured for the video regions, and then image compositing may be performed on the plurality of video segments based on the display time of the key frames and the display position information of the video segments.

For example, assuming that the total duration of video segment A is 20 seconds, the obtained key frame is the video frame corresponding to the video segment A at the 8th second, the display time information configured for the video region a corresponding to the video segment A is 6 to 10 seconds, and the total duration of the video template corresponding to this video region a is 10 seconds, then the video image corresponding to the playback interval of 8 to 12 seconds in the video segment A may be determined as the content displayed in the video region a at 6 to 10 seconds, and the key frame corresponding to the video segment A may be determined as the content displayed in the video region a at 0 to 6 seconds.

After the display contents corresponding to the video region a and the video region b are respectively determined, the display contents are composited to obtain a composited result video corresponding to the video segment A and the video segment B.

In the video generation method according to this embodiment of the present disclosure, a plurality of video segments are first obtained based on a plurality of video regions in a video template, and then with respect to preset action features corresponding to the video template, feature recognition is performed on the video segments, and video frames corresponding to the video segments are determined based on video frames in the video segments having the preset action features; and then image compositing is performed on the plurality of video segments based on the key frames corresponding to the video segments and the display time information and the display position information of the video segments to obtain a composited result video corresponding to the video template. As can be seen, according to the embodiments of the present disclosure, it is possible to implement compositing of a plurality of video segments based on a video template including a plurality of video regions and preset action features, thereby reducing the requirements for the users' video shooting and editing skills and also satisfying the users' experience of participating in video creation.

On the basis of the above embodiments, embodiments of the present disclosure provide the following specific implementations for obtaining a plurality of video segments.

In an optional implementation, a plurality of video segments may be obtained by means of shooting. Specifically, a video shooting page is displayed in response to a first trigger operation on a second video region in the video template, and then a video segment corresponding to the second video region is obtained based on the video shooting page.

In this embodiment of the present disclosure, the first trigger operation may include a click operation applied to any position within the second video region, and may also include a trigger operation for a shooting control that is set in the second video region, and so on, for triggering the display of the video shooting page.

In an optional implementation, obtaining, based on the video shooting page, the video segment corresponding to the second video region may specifically be: obtaining, in response to a shooting trigger operation on the video shooting page, a video segment corresponding to the second video region through real-time shooting.

The shooting trigger operation applied to the video shooting page may include a start operation and an end operation applied to the shooting control on the video capture page in any shooting mode, and the specific shooting mode is not limited in this embodiment of the present disclosure.

In an optional implementation, to facilitate a user to shoot a video segment containing preset action features corresponding to the video template, according to the embodiments of the present disclosure, prompt information corresponding to the preset action features may also be displayed on the video shooting page, so that the user is prompted to shoot the video according to the displayed prompt information. For example, the prompt information corresponding to the preset action features may include hand-raising action prompt information, or the like.

In another optional implementation, a plurality of video segments may be obtained based on a user material page. To this end, an embodiment of the present disclosure further provides an implementation method for obtaining a plurality of video segments. The method includes: first, displaying a user material page in response to a second trigger operation on a third video region in the video template, and then obtaining a video segment corresponding to the third video region based on the user material page.

In this embodiment of the present disclosure, the second trigger operation may include a double-click operation at any position in the third video region, and may also include a trigger operation on an album control that is set in the third video region, and so on, for triggering the display of the user material page.

In this embodiment of the present disclosure, upon receiving the second trigger operation for the third video region in the video template, the user material page may be displayed, and at least one user material may be displayed on the user material page, where the user material may be a video material stored in a local album, or the like. Then, upon receiving a selection operation for a user material displayed on the user material page, the selected user material may be determined as the video segment corresponding to the third video region.

In this embodiment of the present disclosure, video segments may be determined for the respective video regions in the video template by means of shooting or obtaining from a user material page.

In practical applications, since the video segments corresponding to different video regions are shot at different time, the video segments may be different in image brightness and color. Therefore, to make them have closer image brightness and color in the composited result video, before image compositing of the plurality of video segments, the display effect parameter values of the plurality of video segments may be adjusted based on preset display effect information.

In this embodiment of the present disclosure, the preset display effect information may include image brightness information, color information, saturation information, contrast information, or the like, that is pre-configured in the video template. The user may adjust the display effect parameter values of the plurality of video segments based on the preset display effect information corresponding to the video template to obtain a display effect that meets the requirements.

In an optional implementation, an image processing algorithm may be used to adjust the display effect parameter values of the plurality of video segments. Specifically, by invoking the image processing algorithm pre-configured in the video template, the "one-click intelligent" adjustment of the display effect parameter values of the respective video segments may be achieved, which facilitates subsequent image compositing of the plurality of video segments.

In practical applications, the image processing algorithm may be determined based on actual needs, which is not limited in the embodiments of the present disclosure. For example, the image rendering algorithm may include scan-line rendering and rasterization, ray shading, ray casting algorithms, and the like.

In practical applications, among a plurality of video segments obtained for a target object, there may be deviations in the positions of the target object on video images in the plurality of video segments. Therefore, to make the display positions of the target object in the composited result video consistent, before image compositing of the plurality of video segments, the target object in the plurality of video segments may be recognized, and the positions of the target object in the video images in the plurality of video segments may be aligned.

In this embodiment of the present disclosure, the target object may include one or more character objects or item objects in the video segments, such as a human body, a sofa, a building, or the like.

In an optional implementation, the target object in the plurality of video segments corresponding to the video template is first recognized, and then an image alignment algorithm pre-configured in the video template is invoked to align the positions of the target object on the video images in the plurality of video segments.

Figure 4:
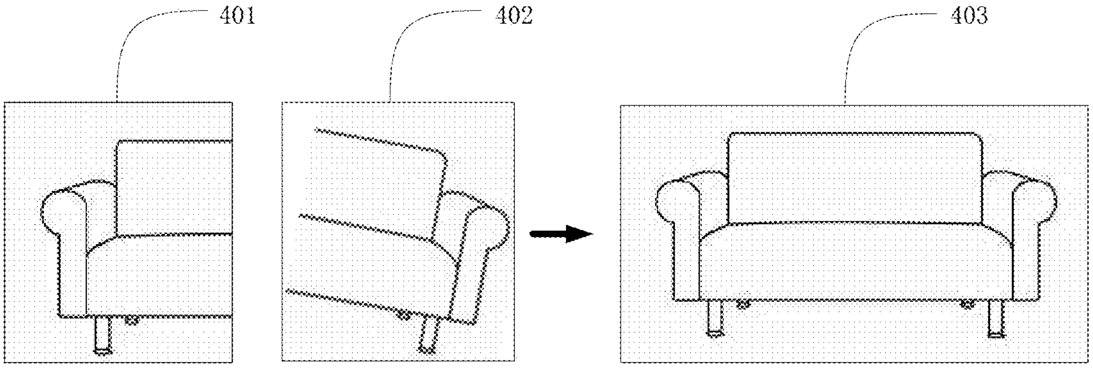
FIG. 4 is a schematic diagram of displaying an alignment effect according to an embodiment of the present disclosure.

FIG. 4 illustrates a schematic diagram showing an alignment effect according to an embodiment of the present disclosure. In this figure, the target object corresponding to video segments 401 and 402 is a sofa. First, image recognition is performed on the video segments 401 and 402 to respectively determine the position information of the sofa in the video segments 401 and 402. Then, the image alignment algorithm is invoked to align the sofa in the video clips 401 and 402 to obtain an aligned video segment 403.

In practical applications, the image alignment algorithm may be determined based on actual needs, which is not limited in the embodiments of the present disclosure. For example, the image alignment algorithm may include a deep learning-based image homography estimation algorithm (Homography Net), or the like.

In addition, weighted image fusion may be performed frame by frame on the video segments respectively corresponding to the plurality of video regions in the video template, so that the composited result video has a better degree of image fusion and a weaker sense of segmentation, thereby further improving the user experience.

In an optional implementation, an image processing algorithm may be pre-configured in the video template, and by invoking the image processing algorithm, weighted image fusion may be performed frame by frame on the video segments corresponding respectively to the plurality of video regions in the video template.

In this embodiment of the present disclosure, the image processing algorithm may be determined based on actual needs, which is not limited in this embodiment of the present disclosure. For example, the image processing algorithm may include pixel weighted averaging (WA), and so on. By invoking the pre-configured image processing algorithm to perform weighted image fusion frame by frame on the plurality of video segments, the degree of image fusion of the composited result video corresponding to the plurality of video segments can be significantly improved.

As can be seen, according to the embodiments of the present disclosure, different processing methods may be used to process a plurality of video segments, so that the composited result video has a better degree of video image fusion and a weaker sense of segmentation, which further facilitates the quick generation of the desired video by the user, thereby improving the user experience.

Figure 5:
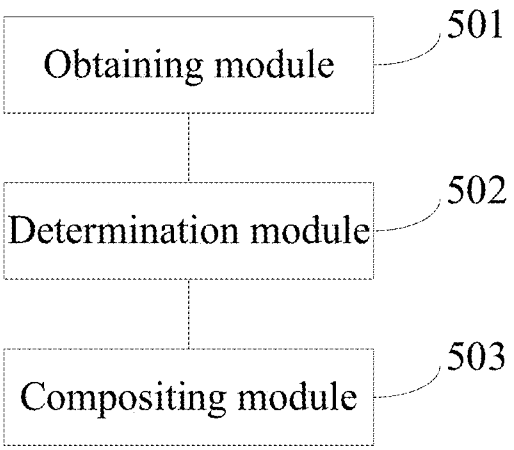
FIG. 5 is a schematic diagram of a structure of a video generation apparatus according to an embodiment of the present disclosure.

Based on the above method embodiment, the present disclosure further provides a video generation apparatus. As shown in FIG. 5, which is a schematic diagram of a structure of a video generation apparatus according to an embodiment of the present disclosure, the apparatus includes:

an obtaining module 501 configured to obtain a plurality of video segments based on a plurality of video regions in a video template, where there is a correspondence between the plurality of video segments and the plurality of video regions, and the video regions are configured with display position information of the corresponding video segments and display time information of the video segments;

a determination module 502 configured to perform, with respect to preset action features corresponding to the video template, feature recognition on the video segments, and determine key frames corresponding to the video segments based on video frames in the video segments having the preset action features; and a compositing module 503 configured to perform image compositing on the plurality of video segments based on the key frames corresponding to the video segments and the display time information and the display position information of the video segments to obtain a composited result video corresponding to the video template.

In an optional implementation, the compositing module includes:

a determination sub-module configured to determine display time of the key frames corresponding to the video segments based on the display time information of the video segments; and a compositing sub-module configured to perform image compositing on the plurality of video segments based on the display time of the key frames corresponding to the video segments and the display position information of the video segments to obtain a composited result video corresponding to the video template.

In an optional implementation, the apparatus further includes:

a parameter value adjustment module configured to adjust display effect parameter values of the plurality of video segments based on preset display effect information.

In an optional implementation, the apparatus further includes:

an alignment module configured to recognize a target object in the plurality of video segments, and align positions of the target object on video images in the plurality of video segments.

In an optional implementation, the apparatus further includes:

a processing module configured to perform weighted image fusion frame by frame on the video segments respectively corresponding to the plurality of video regions in the video template.

In an optional implementation, the determination module includes:

a recognition sub-module configured to perform, with respect to a preset action feature corresponding to a first video region in the video template, feature recognition on a video segment corresponding to the first video region.

In an optional implementation, the obtaining module includes:

a first display sub-module configured to display a video shooting page in response to a first trigger operation for a second video region in the video template, and a first obtaining sub-module configured to obtain a video segment corresponding to the second video region based on the video shooting page.

In an optional implementation, the obtaining module includes:

a second display sub-module configured to display a user material page in response to a second trigger operation for a third video region in the video template; and a second obtaining sub-module configured to obtain a video segment corresponding to the third video region based on the user material page.

In an optional implementation, the apparatus further includes:

a relationship establishing module configured to establish, in response to an operation of dragging a first video segment in the plurality of video segments from a fourth video region to a fifth video region, a correspondence between the first video segment and the fifth video region.

In the video generation apparatus according to this embodiment of the present disclosure, a plurality of video segments are first obtained based on a plurality of video regions in a video template, and then with respect to preset action features corresponding to the video template, feature recognition is performed on the video segments, and video frames corresponding to the video segments are determined based on video frames in the video segments having the preset action features; and then image compositing is performed on the plurality of video segments based on the key frames corresponding to the video segments and the display time information and the display position information of the video segments to obtain a composited result video corresponding to the video template. As can be seen, according to the embodiments of the present disclosure, it is possible to implement compositing of a plurality of video segments based on a video template including a plurality of video regions and preset action features, thereby reducing the requirements for the users' video shooting and editing skills and also satisfying the users' experience of participating in video creation.

In addition to the method and apparatus described above, an embodiment of the present disclosure further provides a computer-readable storage medium having instructions stored therein. The instructions, when run on a terminal device, cause the terminal device to implement the video generation method described in the embodiments of the present disclosure.

An embodiment of the present disclosure further provides a computer program product. The computer program product includes a computer program or instructions. The computer program or instructions, when executed by a processor, cause the video generation method described in the embodiments of the present disclosure to be implemented.

Figure 6:
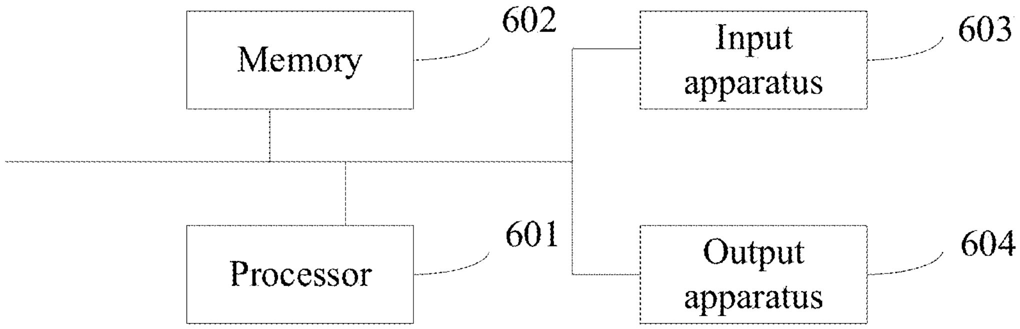
FIG. 6 is a schematic diagram of a structure of a video generation device according to an embodiment of the present disclosure.

In addition, an embodiment of the present disclosure further provides a video generation device. As shown in FIG. 6, the device may include:

a processor 601, a memory 602, an input apparatus 603, and an output apparatus 604. There may be one or more processors 601 in the video generation device. For example, there is one processor in FIG. 6. In some embodiments of the present disclosure, the processor 601, the memory 602, the input apparatus 603, and the output apparatus 604 may be connected through a bus or in another manner. For example, they are connected through the bus in FIG. 6.

The memory 602 may be configured to store a software program and a module. The processor 601 performs various functional applications of the video generation device and processes data by running the software program and the module stored in the memory 602. The memory 602 may mainly include a program storage area and a data storage area. The program storage area may store an operating system, an application required by at least one function, and the like. In addition, the memory 602 may include a high-speed random-access memory, and may further include a non-volatile memory, such as at least one magnetic disk storage device, a flash memory device, or other volatile solid-state storage devices. The input apparatus 603 may be configured to receive entered numerical or character information, and generate a signal input related to a user setting and function control of the video generation device.

Specifically, in this embodiment, the processor 601 loads an executable file corresponding to a process of one or more applications into the memory 602 in accordance with the following instructions, and the processor 601 runs the application stored in the memory 602, to implement various functions of the above video generation device.

It should be noted that the relational terms such as "first" and "second" herein are only used to distinguish one entity or operation from another, and do not necessarily require or imply that any actual relationship or sequence exists between these entities or operations. Moreover, the terms "include", "including", "comprise" and "comprising", or any of their variants are intended to cover a non-exclusive inclusion, so that a process, method, article, or device that includes a list of elements not only includes those elements but also includes other elements that are not expressly listed, or further includes elements inherent to such process, method, article, or device. In the absence of more restrictions, an element defined by "including a . . . "

does not exclude another identical element in a process, method, article, or device that includes the element.

The above description illustrates merely specific implementations of the present disclosure, so that a person skilled in the art can understand or implement the present disclosure. Various modifications to these embodiments are apparent to a person skilled in the art, and the general principle defined herein may be practiced in other embodiments without departing from the spirit or scope of the present disclosure. Therefore, the present disclosure is not limited to the embodiments described herein but is to be accorded the broadest scope consistent with the principle and novel features disclosed herein.

We claim:

1. A video generation method, comprising:

obtaining, based on a plurality of video regions in a video template, a plurality of video segments, the plurality of video segments having a correspondence with the plurality of video regions, and the video regions being configured with display position information of the corresponding video segments and display time information of the video segments;

performing, with respect to preset action features corresponding to the video template, feature recognition on the video segments, and determining key frames corresponding to the video segments based on video frames in the video segments having the preset action features; and performing image compositing on the plurality of video segments based on the key frames corresponding to the video segments and the display time information and the display position information of the video segments to obtain a composited result video corresponding to the video template.

2. The method of claim 1, wherein performing the image compositing on the plurality of video segments based on the key frames corresponding to the video segments and the display time information and the display position information of the video segments to obtain the composited result video corresponding to the video template comprises:

determining display time of the key frames corresponding to the video segments based on the display time information of the video segments; and performing image compositing on the plurality of video segments based on the display time of the key frames corresponding to the video segments and the display position information of the video segments to obtain the composited result video corresponding to the video template.

3. The method of claim 1, wherein before performing the image compositing on the plurality of video segments based on the display time of the key frames corresponding to the video segments and the display position information configured for the video regions corresponding to the video segments to obtain the composited result video corresponding to the video template, the method further comprises:

adjusting display effect parameter values of the plurality of video segments based on preset display effect information.

4. The method of claim 1, wherein before performing the image compositing on the plurality of video segments based on the display time of the key frames corresponding to the video segments and the display position information configured for the video regions corresponding to the video segments to obtain the composited result video corresponding to the video template, the method further comprises:

recognizing a target object in the plurality of video segments, and aligning positions of the target object on video images in the plurality of video segments.

5. The method of claim 1, wherein before performing the image compositing on the plurality of video segments based on the display time of the key frames corresponding to the video segments and the display position information configured for the video regions corresponding to the video segments to obtain the composited result video corresponding to the video template, the method further comprises:

performing weighted image fusion frame by frame on the video segments respectively corresponding to the plurality of video regions in the video template.

6. The method of claim 1, wherein performing, with respect to the preset action features corresponding to the video template, the feature recognition on the video segments comprises:

performing, with respect to a preset action feature corresponding to a first video region in the video template, feature recognition on a video segment corresponding to the first video region.

7. The method of claim 1, wherein obtaining the plurality of video segments based on the plurality of video regions in the video template comprises:

displaying a video shooting page in response to a first trigger operation for a second video region in the video template, and obtaining, based on the video shooting page, a video segment corresponding to the second video region.

8. The method of claim 1, wherein obtaining the plurality of video segments based on the plurality of video regions in the video template comprises:

displaying a user material page in response to a second trigger operation for a third video region in the video template; and obtaining, based on the user material page, a video segment corresponding to the third video region.

9. The method of claim 1, wherein after obtaining the plurality of video segments based on the plurality of video regions in the video template, the method further comprises:

establishing, in response to an operation of dragging a first video segment in the plurality of video segments from a fourth video region to a fifth video region, a correspondence between the first video segment and the fifth video region.

10. A non-transitory computer-readable storage medium having instructions stored therein, wherein the instructions, when run on a terminal device, cause the terminal device to:

obtain, based on a plurality of video regions in a video template, a plurality of video segments, the plurality of video segments having a correspondence with the plurality of video regions, and the video regions being configured with display position information of the corresponding video segments and display time information of the video segments;

perform, with respect to preset action features corresponding to the video template, feature recognition on the video segments, and determining key frames corresponding to the video segments based on video frames in the video segments having the preset action features; and perform image compositing on the plurality of video segments based on the key frames corresponding to the video segments and the display time information and the display position information of the video segments to obtain a composited result video corresponding to the video template.

11. The non-transitory computer-readable storage medium of claim 10, wherein the instructions, when run on the terminal device, causing the terminal device to perform the image compositing on the plurality of video segments based on the key frames corresponding to the video segments and the display time information and the display position information of the video segments to obtain the composited result video corresponding to the video template comprises instructions causing the terminal device to:

determine display time of the key frames corresponding to the video segments based on the display time information of the video segments; and perform image compositing on the plurality of video segments based on the display time of the key frames corresponding to the video segments and the display position information of the video segments to obtain the composited result video corresponding to the video template.

12. A video generation device, comprising: a memory, a processor, and a computer program stored on the memory and including instructions executable on the processor, wherein the processor is configured to execute the instructions to:

obtain, based on a plurality of video regions in a video template, a plurality of video segments, the plurality of video segments having a correspondence with the plurality of video regions, and the video regions being configured with display position information of the corresponding video segments and display time information of the video segments;

perform, with respect to preset action features corresponding to the video template, feature recognition on the video segments, and determining key frames corresponding to the video segments based on video frames in the video segments having the preset action features; and perform image compositing on the plurality of video segments based on the key frames corresponding to the video segments and the display time information and the display position information of the video segments to obtain a composited result video corresponding to the video template.

13. The video generation device of claim 12, wherein the instructions to perform the image compositing on the plurality of video segments based on the key frames corresponding to the video segments and the display time information and the display position information of the video segments to obtain the composited result video corresponding to the video template comprise the instructions to:

determine display time of the key frames corresponding to the video segments based on the display time information of the video segments; and perform image compositing on the plurality of video segments based on the display time of the key frames corresponding to the video segments and the display position information of the video segments to obtain the composited result video corresponding to the video template.

14. The video generation device of claim 12, wherein the processor is further configured to execute the instructions to, before performing the image compositing on the plurality of video segments based on the display time of the key frames corresponding to the video segments and the display position information configured for the video regions corresponding to the video segments to obtain the composited result video corresponding to the video template:

adjust display effect parameter values of the plurality of video segments based on preset display effect information.

15. The video generation device of claim 12, wherein the processor is further configured to execute the instructions to, before performing the image compositing on the plurality of video segments based on the display time of the key frames corresponding to the video segments and the display position information configured for the video regions corresponding to the video segments to obtain the composited result video corresponding to the video template:

recognize a target object in the plurality of video segments, and aligning positions of the target object on video images in the plurality of video segments.

16. The video generation device of claim 12, wherein the processor is further configured to execute the instructions to, before performing the image compositing on the plurality of video segments based on the display time of the key frames corresponding to the video segments and the display position information configured for the video regions corresponding to the video segments to obtain the composited result video corresponding to the video template:

perform weighted image fusion frame by frame on the video segments respectively corresponding to the plurality of video regions in the video template.

17. The video generation device of claim 12, wherein the instructions to perform, with respect to the preset action features corresponding to the video template, the feature recognition on the video segments comprise the instructions to:

performing, with respect to a preset action feature corresponding to a first video region in the video template, feature recognition on a video segment corresponding to the first video region.

18. The video generation device of claim 12, wherein the instructions to obtain the plurality of video segments based on the plurality of video regions in the video template comprise the instructions to:

display a video shooting page in response to a first trigger operation for a second video region in the video template, and obtain, based on the video shooting page, a video segment corresponding to the second video region.

19. The video generation device of claim 12, wherein the instructions to obtain the plurality of video segments based on the plurality of video regions in the video template further comprise the instructions to:

display a user material page in response to a second trigger operation for a third video region in the video template; and obtain, based on the user material page, a video segment corresponding to the third video region.

20. The video generation device of claim 12, wherein the processor is further configured to execute the instructions to, after obtaining the plurality of video segments based on the plurality of video regions in the video template:

establish, in response to an operation of dragging a first video segment in the plurality of video segments from a fourth video region to a fifth video region, a correspondence between the first video segment and the fifth video region.

* * * * *